US012214530B2

(12) United States Patent
O'Brien et al.

(10) Patent No.: US 12,214,530 B2
(45) Date of Patent: Feb. 4, 2025

(54) ONE-PIECE MOLDED LINKAGE ASSEMBLY WITH INSERT MOLDED PINS

(71) Applicants: Magna Exteriors Inc., Concord (CA); Timothy Francis O'Brien, Milford, MI (US)

(72) Inventors: Timothy Francis O'Brien, Milford, MI (US); Daniel Vern Beckley, Byron, MI (US); Brendan James Heaphy, Auburn Hills, MI (US)

(73) Assignee: Magna Exteriors Inc., Aurora (CA)

( * ) Notice: Subject to any disclaimer, the term of this patent is extended or adjusted under 35 U.S.C. 154(b) by 415 days.

(21) Appl. No.: 17/271,695

(22) PCT Filed: Aug. 29, 2019

(86) PCT No.: PCT/US2019/048765
§ 371 (c)(1),
(2) Date: Feb. 26, 2021

(87) PCT Pub. No.: WO2020/047226
PCT Pub. Date: Mar. 5, 2020

(65) Prior Publication Data
US 2021/0252753 A1  Aug. 19, 2021

Related U.S. Application Data

(60) Provisional application No. 62/724,316, filed on Aug. 29, 2018.

(51) Int. Cl.
*B29C 45/14* (2006.01)
*B29L 31/30* (2006.01)
(Continued)

(52) U.S. Cl.
CPC ........ *B29C 45/14467* (2013.01); *B62D 35/00* (2013.01); *B62D 37/02* (2013.01); *B29L 2031/3058* (2013.01)

(58) Field of Classification Search
CPC .. B29C 45/14467; B62D 35/00; B62D 37/02; B29L 2031/3058
See application file for complete search history.

(56) References Cited

U.S. PATENT DOCUMENTS

2007/0234517 A1 * 10/2007 Larson .................. E05D 11/087
16/342
2008/0134466 A1 * 6/2008 Massengill ......... B29C 45/0081
16/386
(Continued)

FOREIGN PATENT DOCUMENTS

CN    203978668 U   * 12/2014
JP    S62167016 A    7/1987

OTHER PUBLICATIONS

Notification of Transmittal of the International Search Report and the Written Opinion of the International Searching Authority or the Declaration-National Application No. PCT/US2019/048765. Mailed Nov. 21, 2019.
(Continued)

*Primary Examiner* — Lori Lyjak
(74) *Attorney, Agent, or Firm* — Warn Partners, P.C.

(57) ABSTRACT

A one-piece linkage assembly (20) includes a linkage base (120, 122, 22) for securement to a structure and a linkage follower (124, 24) fixed to the linkage base (120, 122, 22) with a stainless steel first pivot pin in a hinged configuration. The linkage base (120, 122, 22) and the linkage follower (124, 24) each are made of a molded material, such as plastic, and are formed together with the first metal pivot pin (126, 130, 132, 136, 26, 32, 36) insert molded there between. A linkage coupler (130, 30) and a linkage drive (134, 34) are similarly pivotably secured to the linkage follower (124, 24) in a chained configuration and are also made of the molded material and are formed together with the linkage base (120, 122, 22) and the linkage follower (124, 24), with additional
(Continued)

stainless steel pivot pins insert molded between the linkage follower (124, 24) and the linkage coupler (130, 30) and between the linkage coupler (130, 30) and the linkage drive (134, 34). Compression limiters (146, 46) are also insert molded within a flat portion (142, 42) of the linkage base (120, 122, 22).

16 Claims, 8 Drawing Sheets

(51) Int. Cl.
*B62D 35/00* (2006.01)
*B62D 37/02* (2006.01)

(56) References Cited

U.S. PATENT DOCUMENTS

| | | |
|---|---|---|
| 2008/0271936 A1 | 11/2008 | Kuntz et al. |
| 2015/0084369 A1* | 3/2015 | Niemi ............... B62D 35/02 296/180.1 |
| 2016/0185399 A1 | 6/2016 | Smith et al. |
| 2017/0106922 A1 | 4/2017 | Povinelli et al. |
| 2019/0084628 A1 | 3/2019 | Povinelli et al. |

OTHER PUBLICATIONS

Chinese Office Action for Application No. 01980064895.6 mailed Jul. 26, 2022.
Canadian Office Action for Application No. 3111187 mailed Feb. 22, 2024.

\* cited by examiner

ONE-PIECE MOLDED LINKAGE ASSEMBLY WITH INSERT MOLDED PINS

FIELD OF THE INVENTION

The present disclosure relates generally to a one-piece insert molded articulating linkage assembly.

BACKGROUND

Articulating linkage assemblies are used for a variety of applications where motion between different components of an assembly is desired. One such application is for motion of aerodynamic surfaces on a vehicle, such as air dams or downforce generators between different positions at different speeds and/or in response to other operating parameters.

Such articulating linkage assemblies are traditionally made of several separate pieces, which may include separate linkage members that are cast or molded and then assembled in a series of assembly steps. Such articulating linkage assemblies may include pivot pins connecting the linkage members as well as bushings and fasteners for holding the assembly together and for providing free articulation between the linkage members.

SUMMARY

The present invention pertains to a linkage assembly that is mounted to a vehicle for various active applications. Examples of such active applications include, running boards, spoilers, winglets, roof rails, front air dams, rear air dams, side air dams, wheel well air dams or any other moveable vehicle components.

It is an object of the invention to provide a linkage assembly that prevents exposing the metal pivot pins of the assembly to the outside environment by encasing as much of the metal pivot pins as possible in polymer material composition material. According to a first embodiment of the invention there is provided a linkage assembly that includes a linkage base formed of a polymer material composition. The linkage base being configured to be secured to a structure, such as a vehicle frame, or other body component. The linkage base has two sealed pin connection seats each for retaining one of two ends of a first metal pivot pin. Each of the two sealed pin connection seats prevents exposing the two ends of the first metal pivot pin to the outside environment by encasing each of the two ends in the polymer material composition.

The linkage assembly also includes a linkage coupler formed of the polymer material composition and movable between a stowed position, deployed position and one or more intermediate positions relative to the linkage base. The linkage coupler in certain applications is connected to a component that is the active component, or the moveable component of the vehicle. Examples of components connected to the linkage coupler includes air dams, running boards, spoilers, etc. The linkage coupler has two sealed pin connection seats each for retaining one of two ends of a second metal pivot pin. Each of the two sealed pin connection seats prevents exposing the two ends of the second metal pivot pin to the outside environment by encasing each of the two ends in the polymer material composition.

The assembly also includes a linkage follower pivotally connected to the first metal pivot pin through a first bore in the linkage follower and pivotally connected to the second metal pivot pin through a second bore in the linkage follower. In other words the linkage follower is pivotally connected between the linkage base and the linkage coupler.

Pivotally connected to the linkage coupler and linkage base (through a drive shaft) is a linkage drive formed of the polymer material composition. The linkage drive is movable between a stowed position, deployed position and one or more intermediate positions relative to the linkage base, the linkage drive has two sealed pin connection seats each for retaining one of two ends of a third metal pivot pin, wherein each of the two sealed pin connection seats prevents exposing the two ends of the third metal pivot pin to the outside environment by encasing each of the two ends in the polymer material composition. The linkage drive is pivotally connected to the linkage coupler by the third metal pivot pin extending through a third bore that is formed through the linkage coupler, the linkage drive has a drive connection bore that is connectable with a drive shaft of the linkage base.

An object of the present invention and improvement over the prior art is to reduce the number of components necessary when metal pivot pins are used. According to a second embodiment many of the present invention there is provided a linkage assembly that includes a linkage base formed of a polymer material composition. The linkage base being configured to be secured to a structure, such as a vehicle frame, or other body component. The linkage base has two sealed pin connection seats each for retaining one of two ends of a first metal pivot pin. Each of the two sealed pin connection seats prevents exposing the two ends of the first metal pivot pin to the outside environment by encasing each of the two ends in the polymer material composition.

The linkage assembly also includes a linkage coupler formed of the polymer material composition and movable between a stowed position, deployed position and one or more intermediate positions relative to the linkage base. The linkage coupler in certain applications is connected to a component that is the active component, or the moveable component of the vehicle. Examples of components connected to the linkage coupler includes air dams, running boards, spoilers, etc. The linkage coupler has two sealed pin connection seats each for retaining one of two ends of a second metal pivot pin. Each of the two sealed pin connection seats prevents exposing the two ends of the second metal pivot pin to the outside environment by encasing each of the two ends in the polymer material composition.

The linkage assembly further includes a linkage follower pivotally connected to the first metal pivot pin through a first bore without a bushing between the first metal pivot pin and a surface of the first bore in the linkage follower. The linkage follower is pivotally connected to the second metal pivot pin through a second bore without a bushing between the second metal pivot pin and a surface of the second bore in the linkage follower.

The linkage assembly also has a linkage drive formed of the polymer material composition and movable between a stowed position, deployed position and one or more intermediate positions relative to the linkage base. The linkage drive has two sealed pin connection seats each for retaining one of two ends of a third metal pivot pin, wherein each of the two sealed pin connection seats prevents exposing the two ends of the third metal pivot pin to the outside environment by encasing each of the two ends in the polymer material composition. The linkage drive is pivotally connected to the linkage coupler by the third metal pivot pin extending through a third bore without a bushing between the third metal pin and a surface of the third bore formed through the linkage coupler, the linkage drive has a drive connection bore that is connectable with a drive shaft of the linkage base.

It is further an object of the present invention to provide a more robust linkage coupler that is capable of having greater load strength to allow larger components to be connected. Accordingly a third embodiment of the invention the linkage coupler includes two enhanced flange surface areas of the linkage coupler. Each one of the two enhanced flange surface areas is located adjacent to and extending away a respective one of the two sealed pin connection seats of the linkage coupler and provides additional load strength to the linkage coupler.

BRIEF DESCRIPTION OF THE DRAWINGS

Further details, features and advantages of designs of the invention result from the following description of embodiment examples in reference to the associated drawings.

DETAILED DESCRIPTION

Figure 1:
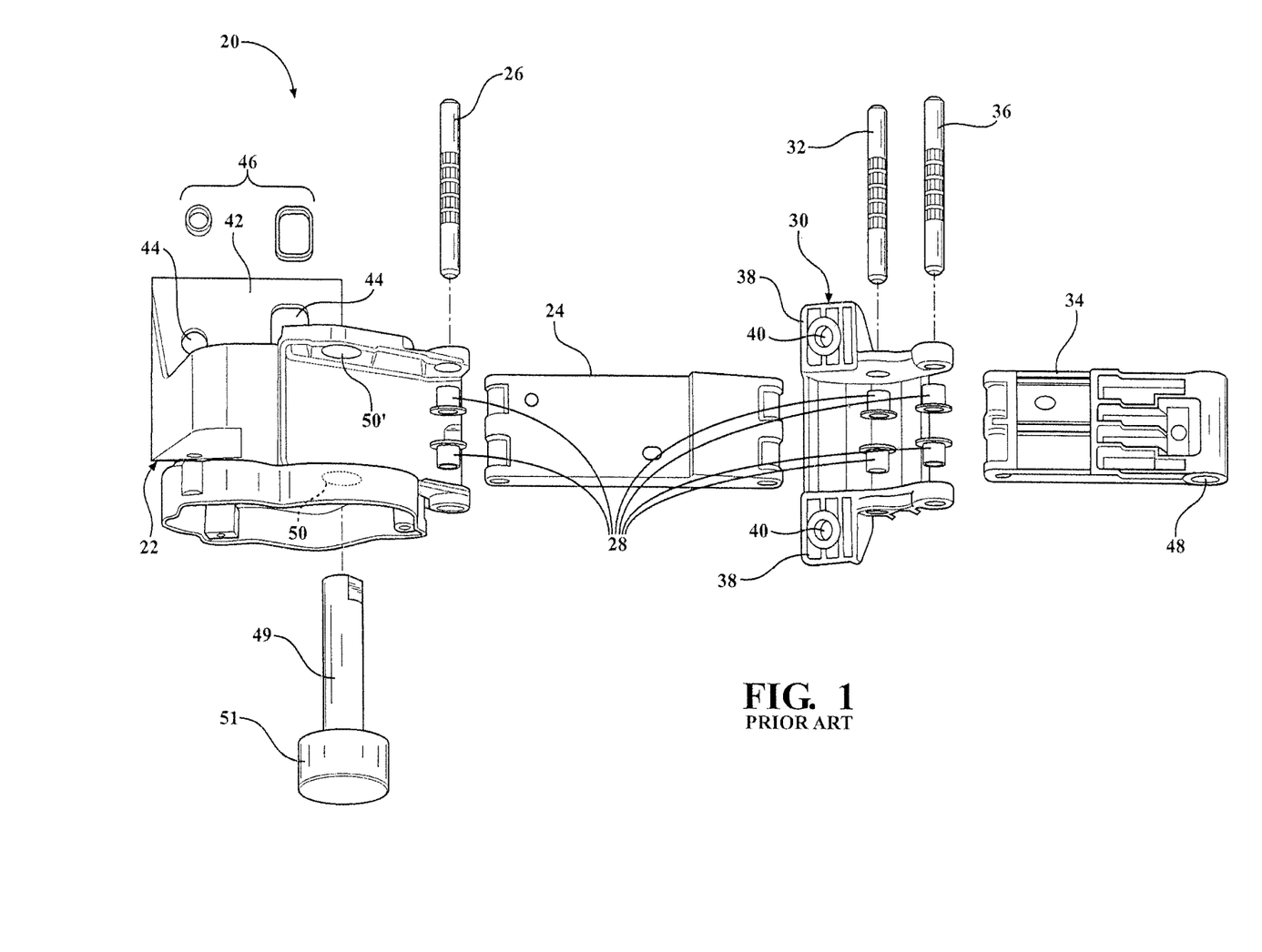
FIG. 1 is an exploded diagram of a prior art multi-piece linkage assembly.
Figure 2:
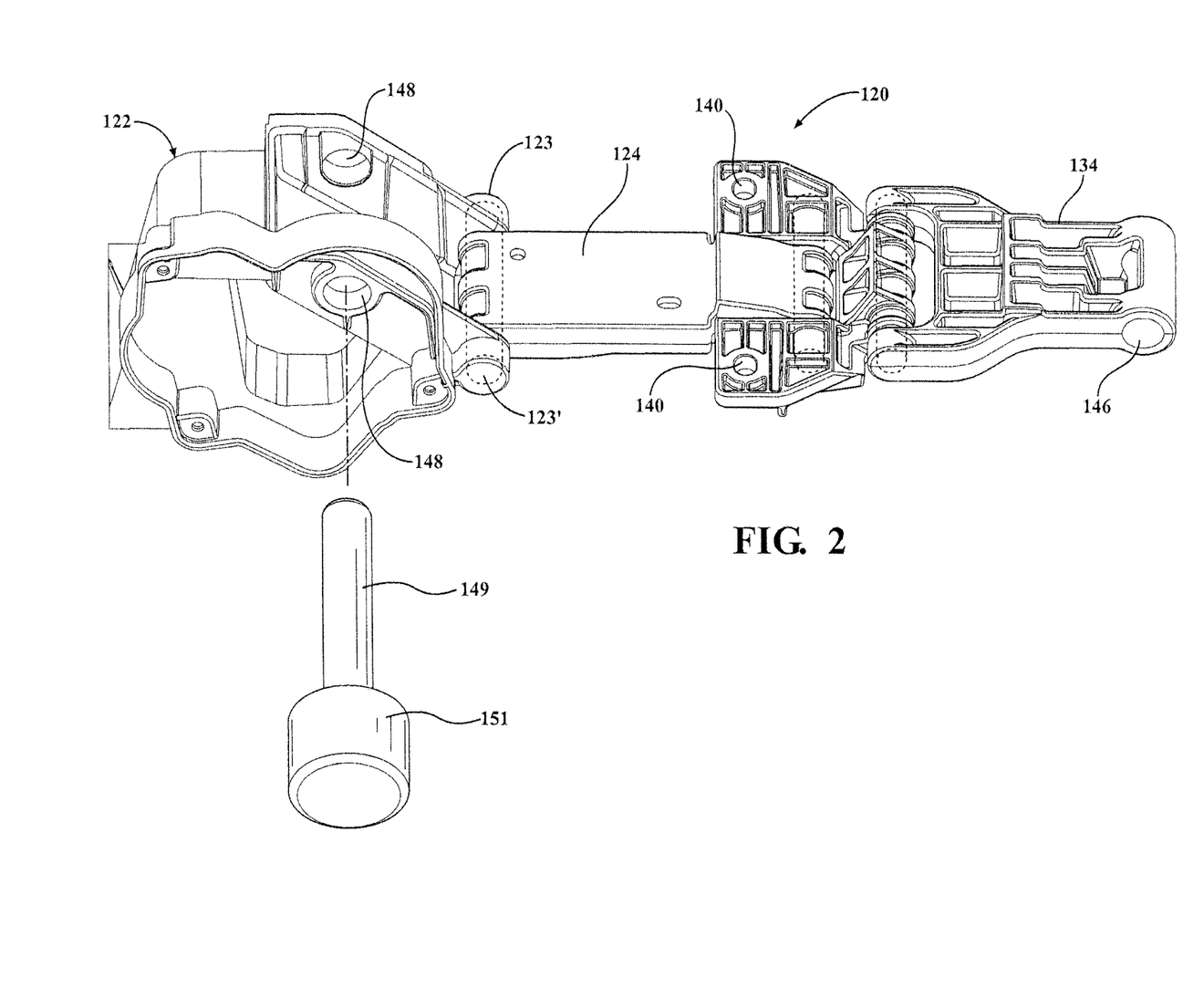
FIG. 2 is a top side profile view of an assembled one-piece linkage assembly of the present invention.

Recurring features are marked with identical reference numerals in the figures, in which a traditional multi-piece linkage assembly 20 is described and contrasted with an example embodiment of a one-piece linkage assembly 120 depicted in FIG. 2. The multi-piece linkage assembly 20 includes a linkage base 22 for attachment to a structure such as a vehicle body. A linkage follower 24 is pivotably secured to the linkage base 22 with a first metal pivot pin 26 of molded plastic and a pair of bushings 28, which may be made of plastic or metal. A linkage coupler 30 is pivotably secured to an end of the linkage follower 24 opposite the linkage base 22 with a second metal pivot pin 32 and with two more bushings 28. A linkage drive 34 is pivotably secured to the linkage coupler 30 with a third metal pivot pin 36 and with two more bushings 28.

Each of the metal pivot pins 26, 32, 36 extend parallel to one another, allowing the linkage assembly 20 to be articulated between a stowed position, deployed position and intermediate position similar to the views of the one-piece linkage assembly 120 shown in FIGS. 11 and 12, where FIG. 11 show the stowed position and FIG. 12 shows the deployed position.

The linkage coupler 30 includes two flanged portions 38, each extending in opposite directions and generally parallel to the metal pivot pins 26, 32, 36 and each defining an aperture 40 for receiving a fastener and for securement of an articulated in member (not shown). The linkage base 22 includes a flat portion 42 defining two mounting holes 44, with each of the mounting holes receiving a corresponding compression limiter 46 having a tubular shape and made of metal for limiting the travel of a fastener, such as a screw or bolt, extending through the corresponding mounting hole 44. The compression limiter 46 thereby prevents the flat portion 42 from being crushed or otherwise damaged by an over-tightened fastener. The compression limiter 46 is placed in the mounting hole 44 as a separate step after molding the linkage base 22 and prior to connection with a vehicle.

The linkage drive 34 defines a drive bore 48 for receiving a drive shaft 49 extends through drive apertures 50, 50' in the linkage base 22. The linkage base 22 may include an actuator 51 that rotates the drive shaft and thereby causes the linkage drive 34 to pivot, articulating the linkage coupler 30 relative to the linkage base 22 and between retracted and extended positions.

Each of the linkage base 22 and the linkage bars 24, 34 and the linkage coupler 30 within the multi-piece linkage assembly 20 are independently molded of plastic and are assembled together with the metal pivot pins 26, 32, 36 and with the bushings 28 in a series of assembly steps. The compression limiters 46 are assembled into the mounting holes 44 of the linkage base 22 in another assembly step.

Figure 3:
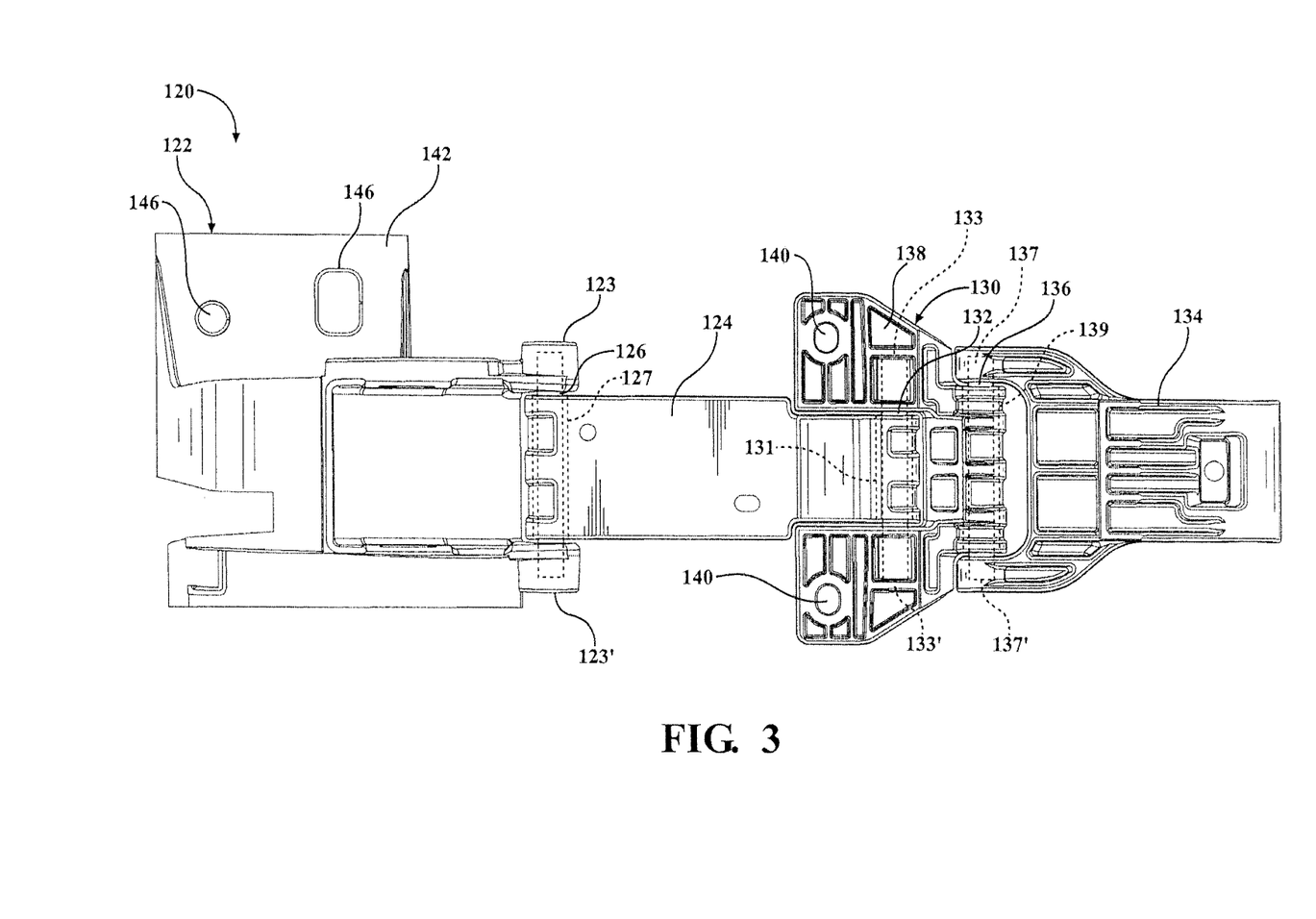
FIG. 3 is a top plan view of the one-piece linkage assembly of the present invention.

As best shown in FIGS. 2-3, the one-piece linkage assembly 120 includes a linkage base 122 configured to be secured to a structure, such as a body of a vehicle. The linkage base 122 has two sealed pin connection seats 123, 123' each for retaining one of two ends of a first metal pivot pin 126. Each of the two sealed pin connection seats 123, 123' prevents exposing the two ends of the first metal pivot pin 126 to the outside environment by encasing each of the two ends in the polymer material that the linkage base 122 is formed from. During formation of the linkage base 122 the polymer integrally molds the first metal pivot pin 126 to the linkage base 122 when forming the two sealed pin connection seats 123, 123' by an irregular end portion or retainment feature section 154, 154' show in FIGS. 4A and 4BB, that is molded into the body of the linkage base 122 to prevent rotation of the first meal pivot pin 126 by the polymer material being formed into the splines or other features of the retainment feature section 154, 154'. The integral molding of the retainment feature section 154, 154' of the first metal pivot pin 126 is done in a way that locks the first metal pivot pin from rotation, however, it is within the scope of this invention for the first metal pivot pin 126 to be only retained by the two pin connection seats 123, 123' and not locked from rotating.

A linkage follower 124 is pivotally connected to the first metal pivot pin 126 by a first bore 127 formed through the linkage follower 124, thereby pivotally connecting the linkage follower 124 to the linkage base 122. The first metal pivot pin 126 is connected through the first bore 127 without a bushing between the first metal pivot pin 126 and a surface of the first bore 127 in the linkage follower 124. The first metal pivot pin 126 has a smooth surface section 152, shown in FIG. 4B that allows the inside surface of the first bore 127 to rotate freely about the first metal pivot pin 126

The one-piece linkage assembly 120 also includes a linkage coupler 130 that is connected with an active component or moveable part of the vehicle that is moveable between a stowed position, deployed position or an intermediate position. For example the linkage coupler 130 of the present invention can be coupled to a spoiler, air dam, running board, tire spats, rear air dams or combinations thereof. The linkage coupler 130 includes two sealed pin connection seats 133, 133' for retaining one of two ends of a second metal pivot pin 132. Each of the two sealed pin connection seats 133, 133' prevents exposing the two ends of the second metal pivot pin 132 to the outside environment by encasing each of the two ends in the polymer material that the linkage coupler 130 is formed from. During formation of the linkage coupler 130 the polymer integrally molds the second metal pivot pin 132 to the linkage coupler 130 when forming the two sealed pin connection seats 133, 133' by an irregular end portion or retainment feature section 154,154' show in FIGS. 4A and 4BB, that is molded into the body of the linkage coupler 130 to prevent rotation of the second metal pivot pin 132. The integral molding of the retainment feature section 154, 154' of the second metal pivot pin 132 is done in a way that locks the second metal pivot pin 132 from rotation, however, it is within the scope of this invention for the second metal pivot pin 132 to be only retained by the two pin connection seats 133, 133' and not locked from rotating.

The linkage coupler 130 is pivotably secured to an end of the linkage follower 124 opposite the linkage base 122 with the second metal pivot pin 132. The linkage follower 124 has a second bore 131 formed through the linkage follower 124, that the second metal pivot pin 132 extends through and thereby allows the linkage follower 124 to pivot about the second metal pivot pin 132. The second metal pivot pin 132 is connected through the second bore 131 without a bushing between the second metal pivot pin 132 and a surface of the second bore 131 in the linkage coupler 130. The second metal pivot pin 132 has a smooth surface section 152, shown in FIG. 4B that allows the inside surface of the second bore 131 to rotate freely about the second metal pivot pin 132.

The one-piece linkage assembly 120 also includes a linkage drive 134 formed of polymer material. The linkage drive 134 is moveable between a stowed position, deployed position and intermediate positions relative to the linkage base 120. The linkage drive 134 has two sealed pin connections seats 137, 137' each for retaining one of two ends of a third metal pivot pin 136. Each of the two sealed pin connection seats 137, 137' prevents exposing the two ends of the third metal pivot pin 130 to the outside environment by encasing each of the two ends in polymer material. The linkage drive 134 is pivotally connected to the linkage coupler 130 by the third metal pivot pin 136 extending through a third bore 139 that is formed through the linkage coupler 130. The third metal pivot pin 136 is connected through the third bore 139 without a bushing between the third metal pivot pin 136 and a surface of the third bore 139 in the linkage coupler 130. The third metal pivot pin 136 has a smooth surface section 152, shown in FIG. 4B that allows the inside surface of the third bore 139 to rotate freely about the third metal pivot pin 136. The linkage drive 134 also includes a drive connection bore 146 that is connectable with the drive shaft 149 of the linkage base 120 that is connected to the actuator 151.

Figures 4A, 4B:
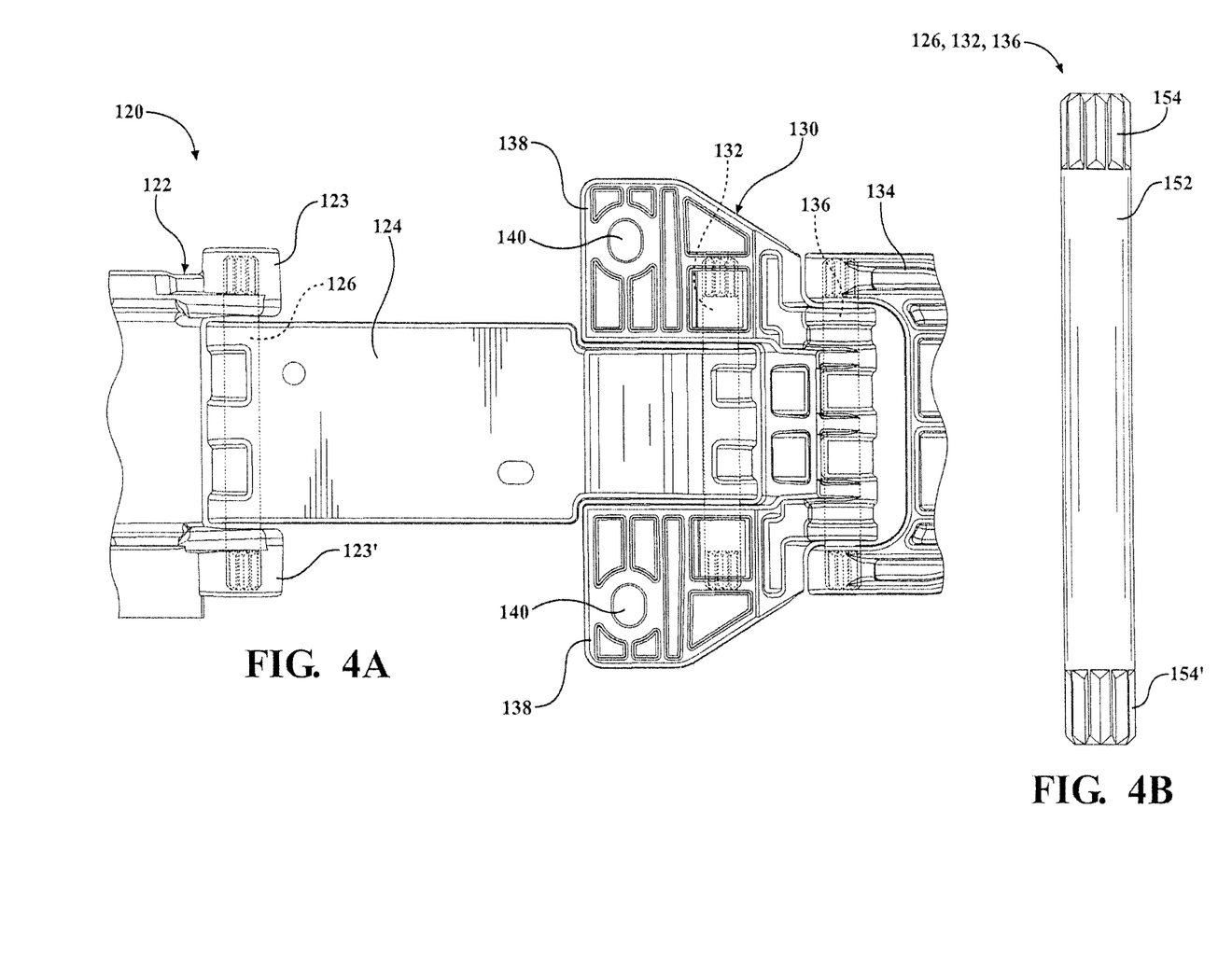
FIG. 4A is a partial semi-transparent sectional view of the one-piece linkage assembly of the present invention.
FIG. 4B is an enlarged profile view of a metal pivot pin of the one-piece linkage assembly of the present invention.

During formation of the linkage drive 134 the polymer integrally molds the third metal pivot pin 136 to the two sealed pin connection seats 137, 137' of the linkage drive 134 by an irregular end portion or retainment feature section 154,154' show in FIGS. 4A and 4BB, that is molded into the body of the linkage drive 134 to prevent rotation of the third metal pivot pin 136. The integral molding of the retainment feature section 154, 154' of the third metal pivot pin 136 is done in a way that locks the third metal pivot pin 136 from rotation, however, it is within the scope of this invention for the third metal pivot pin 136 to be only retained by the two pin connection seats 137, 137' and not locked from rotating.

The linkage base 122, the linkage follower 124, linkage coupler 130, and linkage drive 134 are all made of a polymer material though a molding process such as injection molded plastic, whereby all the components and are formed together with the respective first metal pivot pin 126, second metal pivot pin 132 and third metal pivot pin 136 insert molded there between. The linkage base 122 and the linkage bars 124, 134, and the linkage coupler 130 are also collectively called linkage members 122, 124, 130, 134. The molded material that forms each of the linkage members 122, 124, 130, 134 preferably includes a polymer material composition, such as acrylonitrile butadiene styrene (ABS), polypropylene, polyoxymethylene (POM), glass filled nylon, glass filled polybutylene terephthalate (PBT), but it may include other materials such as fiber reinforcement. Alternatively, the molded material may be a metal. Regardless of type, the molded material should have a lower melting point than the metal pivot pins 126, 132, 136 or any other inserted parts to ensure that the metal pivot pins 126, 132, 136 do not melt or otherwise deform during the molding process.

The metal pivot pins 126, 132, 136 may be made of metal, such as stainless steel, which is desirable for its corrosion resistance. Additionally the metal pivot pins 126, 132, 136 are made of extruded polymer material with extruded fibers, including but not limited to polymer material composition, such as acrylonitrile butadiene styrene (ABS), polypropylene, polyoxymethylene (POM), glass filled nylon, glass filled polybutylene terephthalate (PBT), but it may include other materials such as fiber reinforcement. Other suitable materials may be used so long as they have a high enough melt temperature to remain a solid through the insertion molding process. As shown in FIG. 4B, the metal pivot pins 126, 132, 136 each include a generally smooth center section 152 extending through one of the linkage members 122, 124, 130, 134 for allowing that linkage member 122, 124, 130, 134 to rotate relative to another one of the linkage members 122, 124, 130, 134. For example, as shown in FIG. 4A, the generally smooth center section 152 of the first metal pivot pin 126 extends through the linkage follower 124, thereby allowing the linkage follower 124 to rotate around the first metal pivot pin 126, providing hinged articulation between the linkage base 122 and the linkage follower 124.

As shown in FIG. 4B, the metal pivot pins 126, 132, 136 each also include the retainment feature section 154 adjacent to each of the ends for fixing the metal pivot pins 126, 132, 136 with one of the linkage members 122, 124, 130, 134. More specifically, the retainment feature section 154 of the metal pivot pins 126, 132, 136 includes a plurality of splines extending axially from each of the ends of the metal pivot pins 126, 132, 136.

Figure 5:
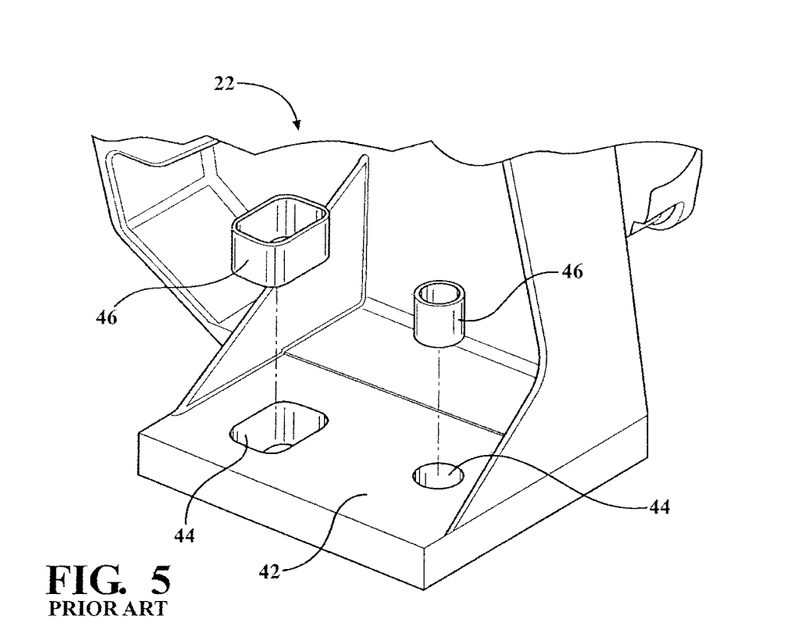
FIG. 5 is an enlarged perspective view of a prior art linkage base with separate compression limiters.
Figure 6:
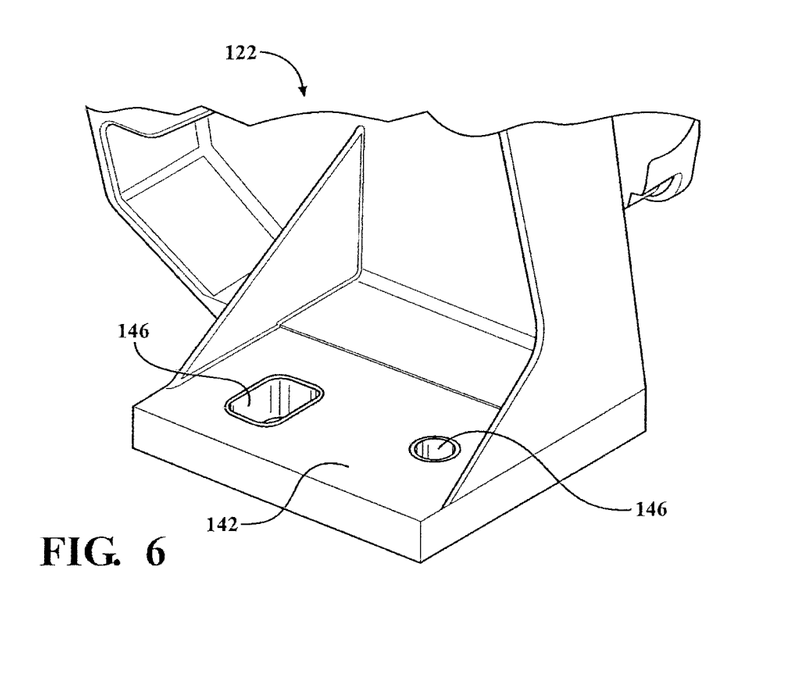
FIG. 6 is an enlarged perspective view of a linkage base within the multi-piece linkage assembly with separate compression limiters.
Figure 7:
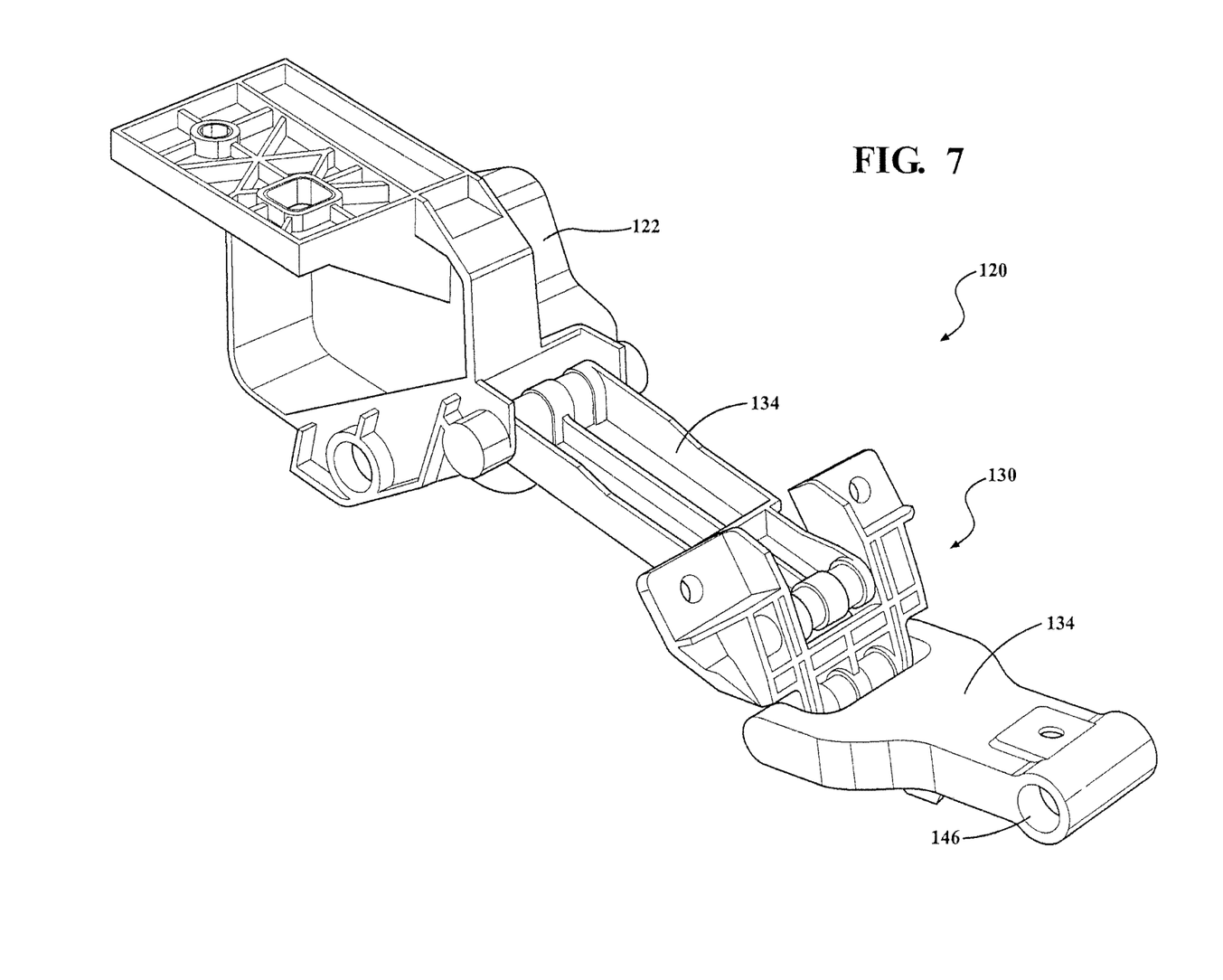
FIG. 7 is a perspective bottom view of a multi-piece linkage assembly according to the present invention.
Figure 8:
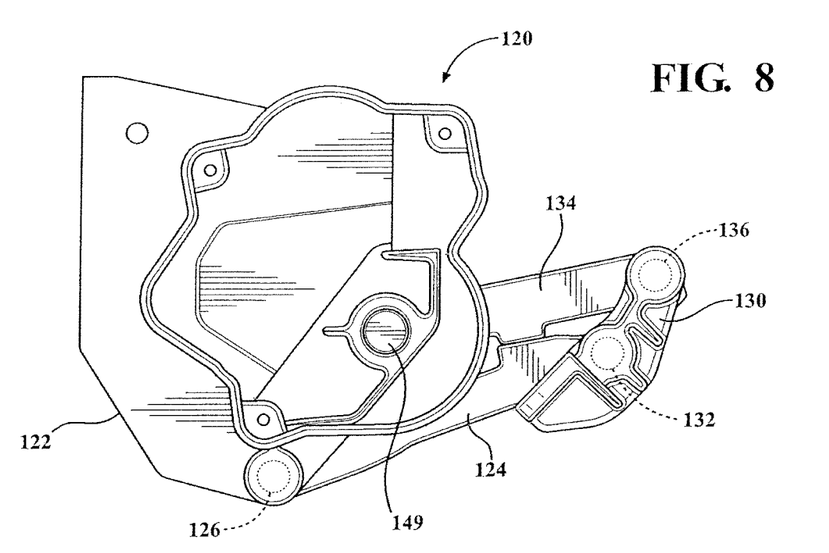
FIG. 8 is a side view of the one-piece linkage assembly of the present disclosure in a retracted position.
Figure 9:
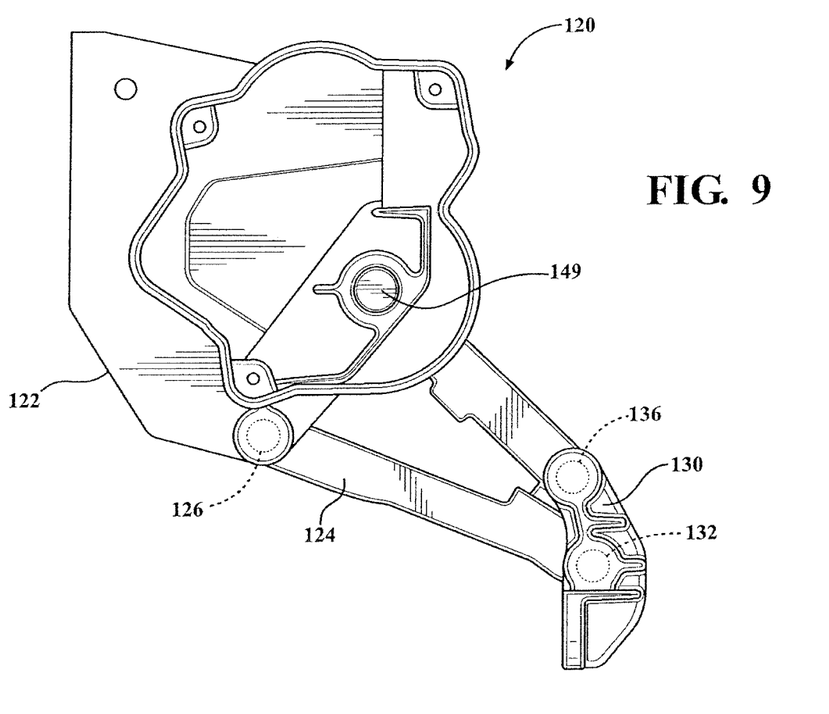
FIG. 9 is a side view of the one-piece linkage assembly of the present disclosure in an extended position.

As best shown in FIG. 6, the linkage base 122 includes a flat portion 142 for securing the linkage base 122 to a structure, such as a chassis or body of a vehicle. One or more compression limiters 146 of metal having a tubular shape extend through the flat portion 142 of the linkage base 122 for receiving a fastener to secure the linkage base 122 to a structure. The compression limiters 146 prevent such fasteners from being over-tightened, which could otherwise cause cracking or other damage to the flat portion 142 of the linkage base 122. The compression limiters 146 are preferably insert molded with the linkage base 122. In other words, the compression limiters 146 are placed within a mold and the linkage base 122 is molded around it. This insert molding obviates the need for any assembly steps of installing the compression limiters. In contrast FIG. 5 depicts a prior art view of the flange 22 where the compression limiters 46 are separate components that must be inserted into apertures 44 during the assembly. The present invention provides the advantage of insert molding the compression limiters 146 during the molding process, thereby reducing the number of components and assembly time.

The one-piece linkage assembly 120 of the present disclosure provides several advantages over the similar multi-piece linkage assembly 20 with a traditional construction. Converting to the one-piece linkage assembly 120 allows for the elimination of the six bushings 28. Furthermore, the one-piece linkage assembly 120 comes out of the mold fully assembled, except for the drive axle (not shown). The one-piece linkage assembly 120 requires only one molding tool, compared to four tools used in molding the separate pieces of the multi-piece linkage assembly 20. A savings in assembly may also be realized because the compression limiters 146 do not need to be installed into the molded linkage base 22, 122. In summary, manufacturing savings can be realized by changing the manufacturing process and molding the four linkage members 122, 124, 130, 134 together as one piece with three insert molded metal pivot pins 126, 132, 136 and two insert molded compression limiters 146.

Figure 10:
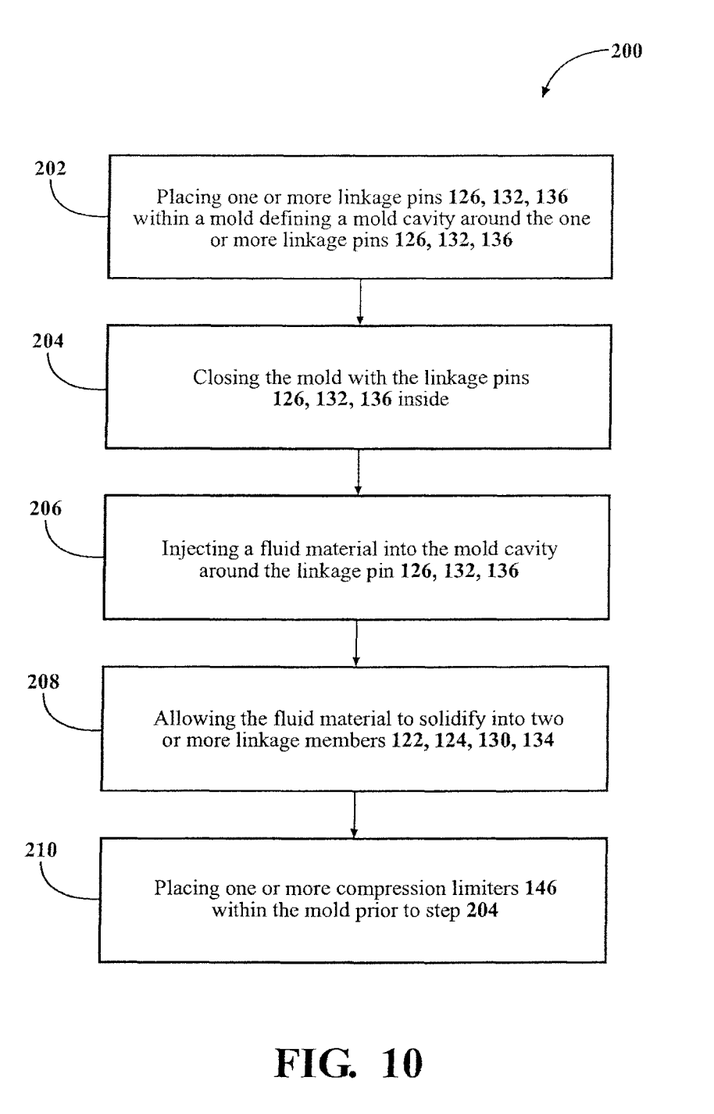
FIG. 10 is a flow chart listing steps in a method of forming a one-piece linkage assembly.

As shown in the flow chart of FIG. 10, a method 200 of forming a one-piece linkage assembly 120 of the present disclosure in a single molding using insert molding is also disclosed. The method includes 202 placing one or more metal pivot pins 126, 132, 136 within a mold defining a mold cavity around the one or more metal pivot pins 126, 132, 136. The method 200 also includes 204 closing the mold with the metal pivot pins 126, 132, 136 inside; and 206 injecting a fluid material into the mold cavity around the metal pivot pins 126, 132, 136.

The 200 continues with step 208, allowing the fluid material to solidify into two or more linkage members 122, 124, 130, 134, such as a linkage base 122, a linkage bar 124, 134, or a linkage coupler 130, with each of the linkage members 122, 124, 130, 134 surrounding a portion of at least one of the metal pivot pins 126, 132, 136 that has another portion that is surrounded by another one of the linkage members 122, 124, 130, 134, and such that the one of the metal pivot pins 126, 132, 136 is captured and shared between two adjacent ones of the linkage members 122, 124, 130, 134. In this way, adjacent ones of the linkage members 122, 124, 130, 134, which share a common one of the metal pivot pins 126, 132, 136, are able to rotate relative to one another, with at least one of the linkage members 122, 124, 130, 134, being free to rotate about the common one of the metal pivot pins 126, 132, 136.

The method 200 may also include 210 placing one or more compression limiters 146 within the mold prior to step 204 closing the mold, so the linkage base 122 is molded with the compression limiters 146 therein as an insert molding.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A one-piece linkage assembly comprising:
a linkage base formed of a polymer material composition, the linkage base being configured to be secured to a structure, the linkage base has two sealed pin connection seats each for retaining one of two ends of a first metal pivot pin, wherein each of the two sealed pin connection seats prevents exposing the two ends of the first metal pivot pin to the outside environment by encasing each of the two ends in the polymer material composition;
a linkage coupler formed of the polymer material composition and movable between a stowed position, deployed position and one or more intermediate positions relative to the linkage base, the linkage coupler has two sealed pin connection seats each for retaining one of two ends of a second metal pivot pin, wherein each of the two sealed pin connection seats prevents exposing the two ends of the second metal pivot pin to the outside environment by encasing each of the two ends in the polymer material composition;
a linkage follower pivotally connected to the first metal pivot pin through a first bore in the linkage follower and pivotally connected to the second metal pivot pin through a second bore in the linkage follower;
a linkage drive formed of the polymer material composition and movable between a stowed position, deployed position and one or more intermediate positions relative to the linkage base, the linkage drive has two sealed pin connection seats each for retaining one of two ends of a third metal pivot pin, wherein each of the two sealed pin connection seats prevents exposing the two ends of the third metal pivot pin to the outside environment by encasing each of the two ends in the polymer material composition, the linkage drive is pivotally connected to the linkage coupler by the third metal pivot pin extending through a third bore that is formed through the linkage coupler, the linkage drive has a drive connection bore that is connectable with a drive shaft of the linkage base;
wherein the first metal pivot pin connects between the linkage base and the linkage follower without any bushings, the second metal pivot pin connects between the linkage follower and the linkage coupler without any bushings and the third metal pivot pin connects between the linkage coupler and the linkage drive without any bushings.

2. The one-piece linkage assembly of claim 1, wherein the first metal pivot pin, the second metal pivot pin and third metal pivot pin all include a generally smooth surface section at the center and a retainment feature section at the two ends of the respective one of the first metal pivot pin, the second metal pivot pin and the third metal pivot pin.

3. The one-piece linkage assembly of claim 1, further comprising:
wherein the first metal pivot pin has a smooth surface section that extends through the first bore in the linkage follower for allowing the linkage follower to rotate relative to the linkage base, the first metal pivot pin also has a retainment feature section at the two ends of the first metal pivot pin that each are disposed in the a respective one of the two sealed pin connection seats of the linkage base;
wherein the second metal pivot pin has a smooth surface section that extends through the second bore in the linkage follower for allowing the linkage follower to rotate relative to the linkage coupler, the second metal pivot pin also has a retainment feature section at the two ends of the second metal pivot pin that each are disposed in the a respective one of the two sealed pin connection seats of the linkage coupler; and wherein the third metal pivot pin has a smooth surface section that extends through the third bore in the linkage coupler for allowing the linkage coupler to rotate relative to the linkage drive, the third metal pivot pin also has a retainment feature section at the two ends of the third metal pivot pin that each are disposed in the a respective one of the two sealed pin connection seats of the linkage drive.

4. The one-piece linkage assembly of claim 3, wherein the retainment features are axial splines.

5. The one-piece linkage assembly of claim 1 further comprising two enhanced flange surface areas of the linkage coupler, each one of the two enhanced flange surface areas is located adjacent to and extending away a respective one of the two sealed pin connection seats of the linkage coupler and provides additional load strength to the linkage coupler.

6. The one-piece linkage assembly of claim 1, wherein the first metal pivot pin, the second metal pivot pin and the third metal pivot pin are all made of stainless steel.

7. The one-piece linkage assembly of claim 1, further comprising:
  a flat portion of the linkage base for securing the linkage base to a structure; and
  a compression limiter of metal having a tubular shape and extending through the flat portion of the linkage base for receiving a fastener for securing the linkage base to a structure.

8. The one-piece linkage assembly of claim 7, wherein the compression limiter is insert molded with the linkage base.

9. A one-piece linkage assembly comprising:
  a linkage base formed of a polymer material composition, the linkage base being configured to be secured to a structure, the linkage base has two sealed pin connection seats each for retaining one of two ends of a first metal pivot pin, wherein each of the two sealed pin connection seats prevents exposing the two ends of the first metal pivot pin to the outside environment by encasing each of the two ends in the polymer material composition;
  a linkage coupler formed of the polymer material composition and movable between a stowed position, deployed position and one or more intermediate positions relative to the linkage base, the linkage coupler has two sealed pin connection seats each for retaining one of two ends of a second metal pivot pin, wherein each of the two sealed pin connection seats prevents exposing the two ends of the second metal pivot pin to the outside environment by encasing each of the two ends in the polymer material composition;
  a linkage follower pivotally connected to the first metal pivot pin through a first bore without a bushing between the first metal pivot pin and a surface of the first bore in the linkage follower, the linkage follower being pivotally connected to the second metal pivot pin through a second bore without a bushing between the second metal pivot pin and a surface of the second bore in the linkage follower; and
  a linkage drive formed of the polymer material composition and movable between a stowed position, deployed position and one or more intermediate positions relative to the linkage base, the linkage drive has two sealed pin connection seats each for retaining one of two ends of a third metal pivot pin, wherein each of the two sealed pin connection seats prevents exposing the two ends of the third metal pivot pin to the outside environment by encasing each of the two ends in the polymer material composition, the linkage drive is pivotally connected to the linkage coupler by the third metal pivot pin extending through a third bore without a bushing between the third metal pin and a surface of the third bore formed through the linkage coupler, the linkage drive has a drive connection bore that is connectable with a drive shaft of the linkage base.

10. The one-piece linkage assembly of claim 9, wherein the first metal pivot pin, the second metal pivot pin and third metal pivot pin all include a generally smooth surface section at the center and a retainment feature section at the two ends of the respective one of the first metal pivot pin, the second metal pivot pin and the third metal pivot pin.

11. The one-piece linkage assembly of claim 9, further comprising:
  wherein the first metal pivot pin has a smooth surface section that extends through the first bore in the linkage follower for allowing the linkage follower to rotate relative to the linkage base, the first metal pivot pin also has a retainment feature section at the two ends of the first metal pivot pin that each are disposed in the a respective one of the two sealed pin connection seats of the linkage base;
  wherein the second metal pivot pin has a smooth surface section that extends through the second bore in the linkage follower for allowing the linkage follower to rotate relative to the linkage coupler, the second metal pivot pin also has a retainment feature section at the two ends of the second metal pivot pin that each are disposed in the a respective one of the two sealed pin connection seats of the linkage coupler; and
  wherein the third metal pivot pin has a smooth surface section that extends through the third bore in the linkage coupler for allowing the linkage coupler to rotate relative to the linkage drive, the third metal pivot pin also has a retainment feature section at the two ends of the third metal pivot pin that each are disposed in the a respective one of the two sealed pin connection seats of the linkage drive.

12. The one-piece linkage assembly of claim 11, wherein the retainment features are axial splines.

13. The one-piece linkage assembly of claim 9 further comprising two enhanced flange surface areas of the linkage coupler, each one of the two enhanced flange surface areas is located adjacent to and extending away a respective one of the two sealed pin connection seats of the linkage coupler and provides additional load strength to the linkage coupler.

14. The one-piece linkage assembly of claim 9, wherein the first metal pivot pin, the second metal pivot pin and the third metal pivot pin are all made of stainless steel.

15. The one-piece linkage assembly of claim 9, further comprising:
  a flat portion of the linkage base for securing the linkage base to a structure; and
  a compression limiter of metal having a tubular shape and extending through the flat portion of the linkage base for receiving a fastener for securing the linkage base to a structure.

16. The one-piece linkage assembly of claim 15, wherein the compression limiter is insert molded with the linkage base.

* * * * *